United States Patent
Hickling (10) Patent No.: US 7,054,228 B1
(45) Date of Patent: *May 30, 2006

(54) SOUND SOURCE LOCATION AND QUANTIFICATION USING ARRAYS OF VECTOR PROBES

(76) Inventor: Robert Hickling, 8306 Huntington Rd., Huntington Woods, MI (US) 48070

( * ) Notice: Subject to any disclaimer, the term of this patent is extended or adjusted under 35 U.S.C. 154(b) by 0 days.

This patent is subject to a terminal disclaimer.

(21) Appl. No.: 10/746,763

(22) Filed: Dec. 26, 2003

Related U.S. Application Data (63) Continuation-in-part of application No. 10/658,076, filed on Sep. 9, 2003, now Pat. No. 6,862,252, and a continuation-in-part of application No. 10/396,541, filed on Mar. 25, 2003.

(51) Int. Cl.
G01S 3/80 (2006.01)
G01N 29/00 (2006.01)

(52) U.S. Cl. .................. 367/124; 367/88; 367/153; 73/594

(58) Field of Classification Search ............ 367/88, 367/99, 147, 153, 141, 124; 73/594, 602
See application file for complete search history.

(56) References Cited

U.S. PATENT DOCUMENTS

| | | | | |
|---|---|---|---|---|
| 4,982,375 A | * | 1/1991 | Ng | 367/135 |
| 5,172,597 A | * | 12/1992 | Hedeen | 73/646 |
| 5,392,258 A | * | 2/1995 | Gabrielson et al. | 367/149 |
| 6,055,214 A | * | 4/2000 | Wilk | 367/99 |
| 6,172,940 B1 | * | 1/2001 | McConnell et al. | 367/178 |
| 6,370,084 B1 | * | 4/2002 | Cray | 367/141 |
| 6,697,302 B1 | * | 2/2004 | Cray et al. | 367/141 |
| 6,738,311 B1 | * | 5/2004 | Guigne | 367/88 |

OTHER PUBLICATIONS

Hickling et al., "Locating sound sources with vector sound-intensity probes, using polynomial continuation", Journal of the Acoustical SOciety of America, (USA), vol. 100, No. 1, Jul. 1996, pp. 49-56.*
U.S. Appl. No. 10/396,541, Robert Hickling.

(Continued)

*Primary Examiner*—Ian J. Lobo
(74) *Attorney, Agent, or Firm*—Reising, Ethington, Barnes, Kisselle, P.C.

(57) ABSTRACT

Method and apparatus for locating and quantifying sound sources using an array of acoustic vector probes (200). Signals received at the probes are converted to digital form and fed into a digital signal processor (400) which computes the sound pressure and the sound-intensity vector at each probe. The set of sound-intensity vectors measured by the array provides a set of directions to a sound source (100) whose approximate spatial coordinates are determined using a least-squares triangulation formula. The sound-intensity vectors also determine sound-power flow from the source. In addition sound pressure measured by the probes can be phased to form a sensitivity beam (250) for scanning a source. Sound-intensity measurements made concurrently can be used to determine the spatial coordinates of the part being scanned and the sound power radiated by that part. Results are displayed on a computer screen or other device (500) permitting an operator to interact with and control the apparatus. Additional related features and methods are disclosed.

13 Claims, 4 Drawing Sheets

OTHER PUBLICATIONS

U.S. Appl. No. 10/658,076, Robert Hickling.

M. Batel et al, "Noise Source Location Techniques-Simple to Advanced Applications", Sound & Vibration, Mar. issue, 24-38, 2003.

R. Hickling et al, "Locating sound sources with vector sound-intensity probes using polynomial continuation", J. Acoust Soc. Amer. 100(1), 49-56, 1996.

M. S. Grewal et al "Global Positioning Systems, Inertial Navigation and Integration", John Wiley& Sons Inc., 2001.

Loran-C User Handbook, Dept. of Transportation, US Coast Guard, Commandant Instruction M16562.3, DC, 1990.

ISO 9614-1:1993(E), "Acoustics-Determination of Sound-Power Levels of Noise Sources using Sound Intensity 1. Discrete Points", ISO, Geneva, Switzerland.

ANSI S12-12-1992, "Engineering Methods for Determination of Sound-Power Levels using Sound Intensity", ANSI, New York, 1992.

W. Wei et al, "Measuring the sound power of a moving source", J. Acoust. Soc. Amer. 97(1), 116-120, 1995.

* cited by examiner

SOUND SOURCE LOCATION AND QUANTIFICATION USING ARRAYS OF VECTOR PROBES

This application is a Continuation-in-part of U.S. patent application entitled "ACOUSTIC MEASUREMENT METHOD AND APPARATUS" Ser. No. 10/396,541, filed 2003, Mar. 25, and also of a continuation-in-part entitled "METHOD AND APPARATUS FOR ACOUSTIC DETECTION OF BURIED OBJECTS" Ser. No. 10/658,076, filed 2003 Sep. 9, now U.S. Pat. No. 6,862,252, both submitted by Robert Hickling, the present inventor.

TECHNICAL FIELD

The invention relates to methods and means of remotely locating and quantifying sound sources, using arrays of recently-developed acoustic vector probes (AVPs).

BACKGROUND OF THE INVENTION

Acoustic Vector Probes

Recently a patent application was filed for a new acoustic instrument, the acoustic vector probe (AVP).
  1. R. Hickling 2003, "Acoustic Measurement Method and Apparatus", Patent Application to the United States Patent and Trademark Office, Ser. No. 10/396,541, Filing Date Mar. 25, 2003.

The technical information contained in this application is hereby incorporated herein by reference.

An AVP consists of a tetrahedral arrangement of four small microphones less than 6 mm in size that simultaneously measures at a point in air the three fundamental quantities of acoustics, namely the sound-intensity and sound-velocity vectors, and sound pressure. Sound intensity is the time average of sound power flow per unit area. The time dependence of sound intensity is determined by taking a series of averages over short intervals. AVPs are more accurate, more compact and less expensive than previous instruments for measuring sound intensity. Nested AVPs can be used to make accurate measurements over a broader frequency range than previous instruments. A calibration procedure described by Hickling (Ref. 1) ensures the probe is accurate and omnidirectional.

The sound-intensity vector determines the direction of a sound source. Because it is expressed as a fast Fourier transform (FFT), it also provides information about the frequency characteristics of the source, enabling the AVP to distinguish one source from another. Sources can also be distinguished by how they occur in time.

Arrays of Acoustic Vector Probes

Subsequently a continuation-in-part was submitted describing the use of an array of AVPs to detect buried objects
  2. R. Hickling, 2003, "Method and Apparatus for Acoustic Detection of Buried Objects", Patent Application to the United States Patent and Trademark Office, Ser. No. 10/658,076, Filing Date Sep. 9, 2003.

The technical information contained in this application is hereby incorporated herein by reference. It describes how the compactness and inexpensiveness of AVPs make them suitable for forming an array. It also indicates that modern digital signal processing permits simultaneous measurement at all the AVPs.

Previous Methods of Sound Source Location Using Arrays

Previous methods of locating and quantifying sound sources using arrays have been described recently by
  3. M. Batel, M. Marroquin, J. Hald, J. J. Christensen, A. P. Schuhmacher and T. G. Nielsen, 2003, "Noise Source Location Techniques—Simple to Advanced Applications", Sound & Vibration, March issue, 24–38.

These can be summarized briefly as follows.

Measurements at the Source:

(a) Sound pressure mapping This method consists of sound pressure measurements at different locations on the surface of a source. The method is unsatisfactory because pressure measurements do not measure sound power flow at the surface.

(b) Sound intensity and selective intensity In this method a two-microphone probe is used to measure the component of sound intensity at a point perpendicular to the surface of a source. It can therefore be used to rank the sound power outputs of different components of the source and to sum these outputs to obtain the total radiated sound power. The method is quite effective. However the measurements usually have to be made by hand, and it is not easy to convince technicians to stand next to a sound source, such as an engine, for extended periods and perform careful, tedious measurements. There are also safety factors to consider. Another disadvantage is the clumsy face-to-face microphone arrangement with U-shaped holder that is used as a two-microphone probe. Because of these difficulties, there is a need to make measurements remote from the source, using methods where there is less emphasis on manual work and more on improved measurement techniques and computation.

Measurements with Arrays Remote from the Source:

(c) Near-field acoustic holography This method measures sound pressure at an array of individual microphones remote from the source and computes the sound field from this data. The computed field is then used to determine how the source radiates sound. However the computations can be difficult to understand and involve assumptions and approximations that can introduce misrepresentations and inaccuracies. Measurements of sound pressure in parallel planes are used to determine the components of sound velocity and sound intensity perpendicular to the planes.

(d) Non-stationary acoustic holography This is a development of near-field acoustic holography for a non steady source.

(e) Beam forming This method uses a phased array of individual sound-pressure microphones to form a beam with directional sensitivity, which can scan the surface of a source to obtain the approximate relative contributions of different parts of the source. Beam forming is a well-known and easily understood technique. Side lobes of the primary beam can cause error but methods developed by Batel et al can reduce this effect. A major disadvantage of the method is that it does not quantify the sound radiated by the source within the beam.

(f) Inverse boundary element methods. These provide additional mathematical modeling of sound radiated by the source.

Triangulation and Other Positioning and Locating Techniques

A mathematical technique for locating sound sources using AVPs was published previously by 4. R. Hickling and A. P Morgan, 1996, "Locating sound sources with vector sound-intensity probes using polynomial continuation", Journ. Acoust. Soc. Amer 100 (1), 49–56.

This method is incapable of dealing with measurement error and the finite size of sources. Hence there is a need for a least-squares triangulation formula. Triangulation is a well-known concept. Positioning systems that use triangulation have been described in texts such as 5. M. S. Grewal, A. P. Andrews and L. R. Weill, 2001, "Global Positioning Systems, Inertial Navigation and Integration", John Wiley & Sons Inc.
6. Loran-C User Handbook, 1990, Department of Transportation, US Coast Guard, Commandant Instruction M16562.3 Washington D.C.

These systems are based on time of arrival of radio waves and not on sound. Generally they consist of several transmitters and one receiver, whereas source location with an array of AVPs involves a single transmitter and a number of receivers.

Arrays of Sound-Intensity Probes for Measuring Sound Power

There are standard procedures for measuring the sound power of a source using an array of sound-intensity probes surrounding the source:

7. ISO 9614-1: 1993 (E), "Acoustics—Determination of Sound Power Levels of Noise Sources using Sound Intensity, Part I Measurement at Discrete Points", International Organization for Standardization, Geneva, Switzerland.
8. ANSI S12-12-1992., "Engineering Methods for Determination of Sound Power Levels using Sound Intensity", American National Standards Institute, New York.

In these procedures it is assumed that two-microphone sound-intensity probes are used, aligned perpendicularly to the array. Generally such probes are clumsy and expensive and it is difficult to use them in sufficient numbers to make simultaneous measurements at all points in the surrounding array.

In another paper the sound power of a moving source in water was determined using a single four-hydrophone vector probe.

9. W. Wei and R. Hickling, 1995, "Measuring the Sound Power of a Moving Source", Journ. Acoust. Soc. Amer., 97(1), 116–120.

Here it was assumed that the source moves along a known straight path and that its sound power can be determined by integrating over an imaginary infinite cylinder enclosing the source along its path. The four-hydrophone probe is clumsy and less compact, and is not as accurate and versatile as an AVP.

BACKGROUND OF THE INVENTION—OBJECTS AND ADVANTAGES

What is needed and desired is a new approach to locating and quantifying sound sources using an array of AVPs that (a) replaces with AVPs the individual microphones and two-microphone probes used previously in measurement with arrays.
(b) uses a least-squares triangulation formula to determine the spatial coordinates of a sound source from the set of directions determined by an array of AVPs.
(c) determines the sound power of a source using simultaneous measurements with an array of AVPs surrounding the source.
(d) forms a sensitivity beam using sound-pressure measurents by an array of AVPs and at the same time uses the sound-intensity measurements to:
    1. determine the spatial coordinates of the object highlighted by the beam
    2. calculate the sound power radiated in the beam by the object.
(e) distinguishes between sources with different frequency characteristics and locates these sources using the least-squares formula.
(f) provides more precise data input for computational methods of locating and quantifying sound sources.
(g) uses data-acquisition and processing systems that are rapid and inexpensive.
(h) provides systems that can be controlled interactively by the operator to obtain as much information as possible about noise sources.

Further objects and advantages of this invention will become apparent from a consideration of the following description and drawings.

SUMMARY OF THE INVENTION

The present invention includes and utilizes arrays of acoustic vector probes (AVPs) with the object of remotely locating and quantifying sound sources. AVPs are small, rugged and inexpensive and can easily be formed into an array.

An important part of the invention is a least-squares triangulation formula for locating sound sources that allows for measurement error and the finite size of the source. A brief proof of the formula is given in an appendix at the end of the specifications. The need for the least-squares formula can be understood by considering the example of a single source with two AVPs at different positions in space. Each AVP determines a different direction to the source. Elementary thinking would position the source where the directions intersect. However because of experimental error and the finite size of the source the directions determined by AVPs generally do not intersect. Hence the source is located using a least-squares fit.

In addition to determining direction, the sound-intensity vector measures the sound power flow from the source. The distribution of sound power flow can be measured by an array of AVPs. This can be integrated over the array to obtain the total sound power flow, either from the direction of the source, or perpendicular to the array, or from some other direction.

There is an important case when an array surrounds a source either totally or combined with rigid surfaces. Integration over the array of the component of the intensity vector perpendicular to the array then determines the sound power of the source. Previously two-microphone probes were used for this purpose. However such probes are cumbersome and expensive and it is difficult to use a sufficient number of them to make simultaneous measurements at all points in the surrounding array. AVPs, on the other hand, are more compact and less expensive and can make the required simultaneous measurements. This speeds up the sound power measurement, and also makes it possible to investigate the sound power of a non-steady source. It also makes it possible to measure the sound power of a source in a noisy environment, provided the background noise is not overwhelming compared to that of the source. In addition, the techniques of this invention can be used to investigate the characteristics of the source. These improvements make it possible to use an array of AVPs for quality control in manufacturing.

When it is not possible for the array to surround the source, it can still have applications such as locating and tracking a moving source and determining its sound power at the array.

A sensitivity beam can be formed by phasing the sound pressure measured by an array of AVPs. Since sound intensity is measured concurrently with sound pressure it can be integrated over the cross-section of the beam to determine sound power flow in the beam. This overcomes the previous difficulty of not being able to measure sound power in a beam. Also the least-squares triangulation formula can be used to determine the location of the region highlighted by the beam.

AVPs simultaneously measure the three fundamental quantities of acoustics, namely intensity, velocity and pressure. Using these quantities as input for computational methods of source location and quantification will improve the accuracy of these methods and save time and effort by avoiding having to make measurements with parallel arrays of individual microphones.

DETAILED DESCRIPTION OF THE PREFERRED EMBODIMENT

Figure 1:
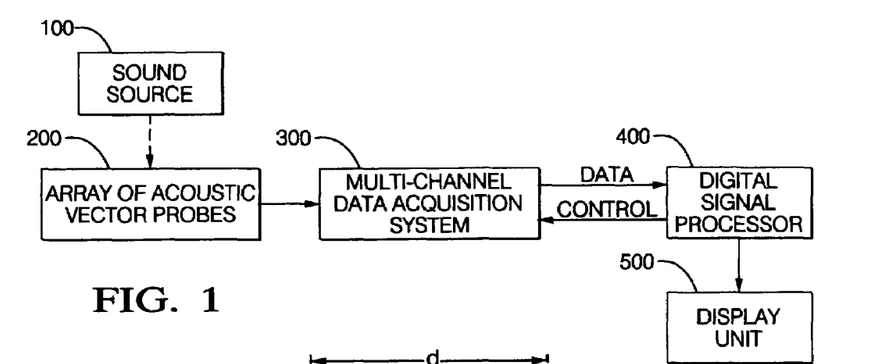
FIG. 1 is a block diagram showing a sound source, an array of acoustic vector probes (AVPs), a multi-channel data-acquisition system for rapid analog to digital conversion and temporary data storage, a signal processor, and a display unit.

FIG. 1 is a block diagram illustrating the apparatus for source location and quantification of the present invention. Block 100 represents a sound source. Block 200 represents an array of AVPs. Block 300 represents a multi-channel data-acquisition system for rapid analog to digital conversion of the signals from the array, and for data storage, prior to input to the digital signal processor represented by block 400. The processor computes the three components of the sound-intensity vector and the sound pressure at each AVP in the array and interprets the data, displaying the results on an output device 500 such as a monitor screen. The sound-intensity vector is used to detect, position and quantify sound sources. The sound-pressure measurements can be phased to form a sensitivity beam.

Figure 2:
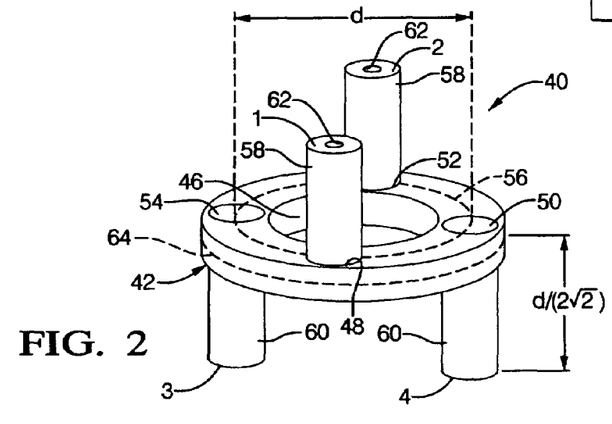
FIG. 2 is a perspective view of an AVP forming a part of the invention.

In FIG. 2 numeral 40 generally indicates an AVP formed in accordance with the invention. Probe 40 includes a fixture 42 being an annular member formed as a ring with a central opening 46. Protruding from the ring are four support tubes for the microphones parallel to the axis of the ring, two on one side of the ring pointing in one direction and two on the reverse side pointing in the opposite direction. These tubes are spaced around the ring at ninety degree intervals at openings in the ring at 48, 50, 52 and 54, and centered on an annular centerline 56 having a diameter d. The pair of tubes 58 on one side of the ring is attached to the ring coincident with diametrically opposite openings 48 and 50, and the pair of tubes 60 on the reverse side of the ring is attached to the ring coincident with diametrically opposite openings 52 and 54. The outer ends of the support tubes 58, 60 are each a distance $d/(2\sqrt{2})$ from the central base plane 64 of the ring and a distance $d/\sqrt{2}$ from each other. Within the ends of the two support tubes 58 are located microphones 1, 2 and within the ends of the support tubes 60 are located microphones 3 and 4. Microphones 1 through 4 are located at the vertices of an imaginary regular tetrahedron. The advantages of the structure in FIG. 2 are: (a) the microphones are symmetric on the two opposite sides of the base ring so that they detect sound equally from both directions; (b) the measurement point M is well defined; (c) the procedure for normalizing and calibrating can be applied easily. Since the dimensions of the probe are required to be much less than the wavelengths being measured, the effect of diffraction will be insignificant.

Figure 3:
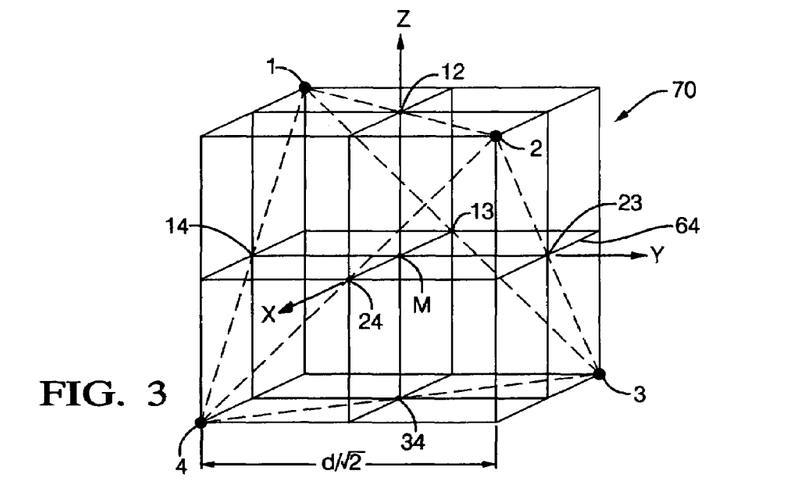
FIG. 3 is a cubic lattice diagram showing the geometry of the tetrahedral arrangement of microphones in the AVP and the relation of the microphones to the system of Cartesian coordinates used in making measurements at the origin M.

In FIG. 3, the geometric placement of the four microphones in the tetrahedral arrangement is shown inserted within an imaginary cubic lattice 70 having 6 faces with midpoints 12, 13, 14, 23, 24, 34. Lines through the midpoints of the opposite faces of the lattice pass through an origin M, which is the measurement point, and form X, Y and Z axes of the cubic lattice 64. The lines between the microphones form diagonals (not shown) across the faces of the cubic lattice, which also represent the edges of the regular tetrahedron and pass through the midpoints 12, 13, 14, 23, 24 and 34 with a length of the dimension d. These lines form hypotenuse lines for the respective faces of the cubic lattice 64 so that the edges of the sides of the lattice have dimension $d/\sqrt{2}$.

At the microphones 1, 2, 3 and 4 at the vertices of the regular tetrahedron in FIG. 2, the corresponding sound pressures p1, p2, p3 and p4 are measured and digitized. The discrete Fourier transforms (DFTs) of the sound pressures are then computed, normalized and calibrated using the transfer-function procedure described by Hickling in Ref. 1, giving the modified transforms $Fp1(f)$, $Fp2(f)$, $Fp3(f)$ and Fp4(f) at the discrete points $f=f_i$, $i=1, \ldots n$. For simplicity, the frequency dependence (f) will be dropped. Finite difference approximations (derived from Taylor series expansions) are then used to obtain the DFTs of the sound pressures at the six midpoints of the edges of the regular tetrahedron at 12, 13, 14, 23, 24 and 34 in FIG. 3, giving respectively $$Fp12=(Fp1+Fp2)/2 \; Fp13=(Fp1+Fp3)/2 \; Fp14=(Fp1+Fp4)/2 \; Fp23=(Fp2+Fp3)/2 \; Fp24=(Fp2+Fp4)/2 \; Fp34=(Fp3+Fp4)/2. \quad (1)$$

These approximations are accurate to the second order, i.e. order $(kd)^2/4$, provided.

$$kd/2<1 \quad (2)$$

The components of the sound-intensity vector at the measurement point M are determined from the sound pressure DFTs in Equation (1), using the cross-spectral formulation de for sound intensity described by Hickling (Ref 1). The components are $$FIX=\underline{Im}CS[Fp24, Fp13]/(\rho 2\pi f(d/\sqrt{2}))$$

$$FIY=\underline{Im}CS[Fp23, Fp14]/(\rho 2\pi f(d/\sqrt{2}))$$

$$FIZ=\underline{Im}CS[Fp12, Fp34]/(\rho 2\pi f(d/\sqrt{2})) \quad (3)$$

where Im is the imaginary part and CS is the cross spectrum of the sound pressures at the midpoints of the opposite edges of the imaginary regular tetrahedron in FIG. 3, and p is the density of the fluid medium, which is approximately 1.3 kg/m$^3$ for air. The amplitude of the sound-intensity vector is given by $$FIA=\sqrt{[FIX^2+FIY^2+FIZ^2]} \quad (4)$$

Sound intensity is expressed in SI units of watts per meter squared per hertz.

Figure 4:
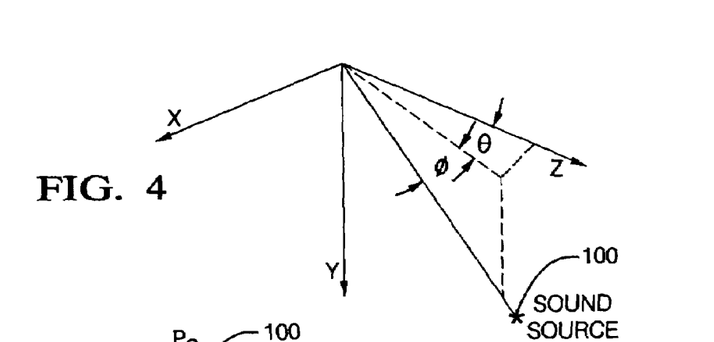
FIG. 4 shows the coordinate system for determining the direction of a sound-intensity vector in azimuth and elevation, relative to the coordinate system of the AVP.

The direction of a sound source can be expressed in terms of the horizontal (azimuth) angle $\theta$. and the vertical (elevation) angle $\phi$. The combination of these two angles specifies the direction of the source, as shown in FIG. 4. The vector probe points in the direction of the Z-axis in FIG. 3 and the Y-axis is vertical. The angles $\theta$ and $\phi$ are determined from the relations $$\theta=\arctan(FIX/FIZ) \quad (5)$$

and $$\phi=\arcsin(FIY/FIA) \quad (6)$$

where the terms come from Equations (3) and (4). The angles $\theta$ and $\phi$ are functions of frequency. They can be represented over the frequency range by a set of discrete points in an elevation-azimuth (or vertical-horizontal) plot, relative to the direction of the probe. The DFT of the sound-intensity vector determined by a probe provides a set of angles in azimuth and elevation $\theta_i$ and $\phi_i$ for each point $f=f_i$, $i=1$, n in the frequency range of the DFT, together with a corresponding set of amplitudes of the sound intensity vector $w_i=FIA(f_i)$ from Equation (4). Azimuth-elevation plots generally show a scatter of points as a function of frequency and it is necessary to interpret this scatter in terms of sources that may be present and in terms of the acoustic environment. Usually an azimuth-elevation plot shows a concentration of points in the direction of a source and a study has to be made to find such concentrations. For a particular concentration that is common to all probes in the array a single representative direction in the azimuth and elevation angles $\Theta$ and $\Phi$ is determined for each probe, using techniques such as one based on weighted averages $$\Theta = \sum_{i=1}^{m} w_i \theta_i / W \quad (7)$$

$$\Phi = \sum_{i=1}^{m} w_i \varphi_i / W$$

where $W=\Sigma_{i=1}^{m}$ and the range $i=1$ to m covers the concentration of points in the azimuth-elevation plot. If more than one source is indicated, the direction to each of the sources can be determined using a similar averaging procedure, according to their frequency content or from other characteristics.

Figure 5:
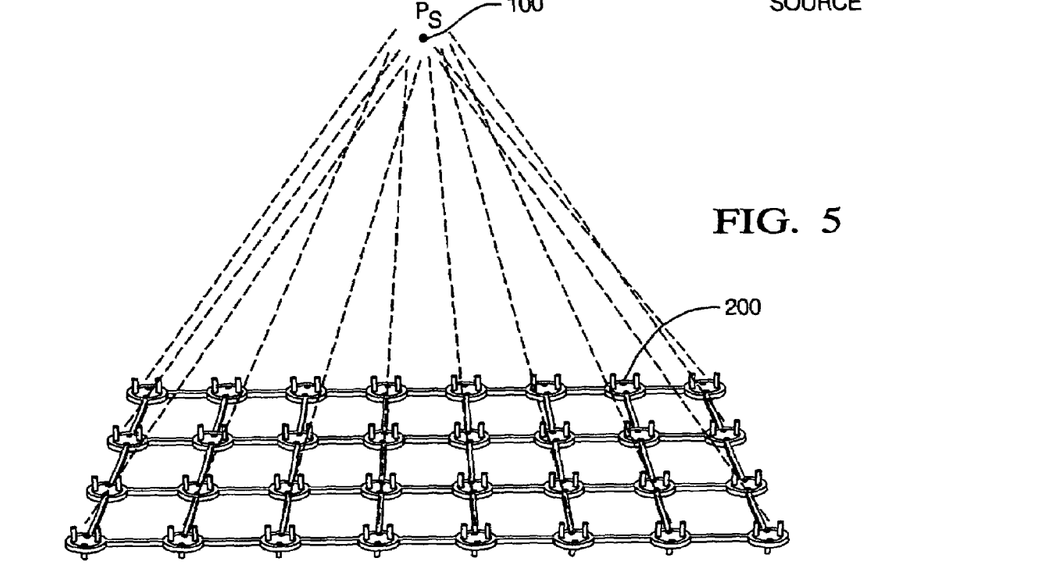
FIG. 5 illustrates a set of directions towards a sound source from an array of AVPs as used in the least-squares triangulation formula to determine the location of the source.
Figure 6:
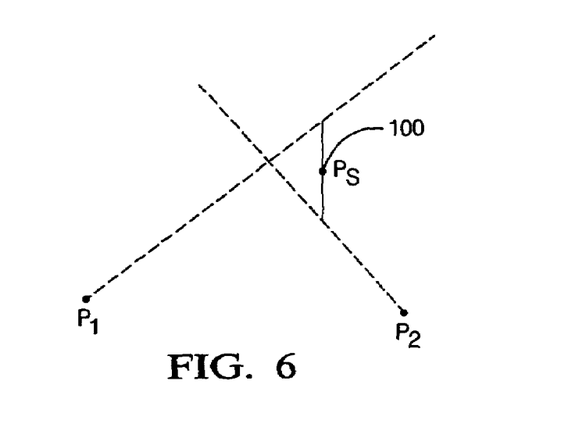
FIG. 6 shows the geometry of the least-squares triangulation formula in locating a sound source with two AVPs. The formula places the source at the midpoint of the normal between the directions towards the source from the AVPs

After finding a set of averaged directions the next step is to apply the least-squares triangulation formula derived in the Appendix to determine the spatial coordinates of the source. Vectors and matrices are indicated in bold type. As shown in FIG. 5, it is assumed that there is an array of n AVPs with coordinate vectors $p_1, p_2, \ldots p_n$, and corresponding unit vectors $w_1, w_2, \ldots, w_n$ pointing towards the source at the location 100 or $P_S$. The least-squares formula then determines the coordinate vector q, of $P_S$ at location 100. From the Appendix the formula is $$q = \left[ nI - \sum_{i=1}^{n} u_i u_i^T \right]^{-1} \sum_{i=1}^{n} [I - u_i u_i^T] p_i \quad (8)$$

where I is the 3×3 identity matrix and the superscript T indicates a vector transpose. The formula in Equation (8) can be readily programmed using standard software such as LABVIEW and MATLAB. Not all the AVPs in the array are needed for source location. In principle only two AVPs are required, but using a greater number of AVPs provides better statistical accuracy. Also, for accuracy, the dimensions of the array should be approximately the same as the distance from the source. FIG. 6 shows the case for two AVPs. $P_1$ is the location of one AVP with Cartesian coordinates $(x_1, y_1, z_1)$ and corresponding coordinate vector $p_1$ and $p_2$ is the location of the other AVP with Cartesian coordinates $(x_2, y_2, z_2)$ and vector $p_2$. The AVP at $P_1$ points to the source 100 with azimuth and elevation angles $(\Theta_1, \Phi_2)$ while the AVP at $P_2$ points to the source with angles $(\Theta_1, \Phi_2)$. The corresponding unit vectors are then $$w_1=(\sin \Theta_2 \cos \Phi_1, \sin \Phi_1, \cos \Phi_1 \cos \Theta_1)$$

and $$w_2=(\sin \Theta_2 \cos \Phi_2, \sin \Phi_2, \cos \Phi_2 \cos \Theta_2).$$

For n=2 Equation (2) becomes $$q=[2I-u_1u_1^T-u_2u_2^T]^{-1}[(I-u_1u_1^T)p_1+(I-u_2u_2^T)p_2] \quad (9)$$

It can be shown that the geometric form of this equation positions the source at the midpoint of the normal connecting the directions from $P_1$ and $P_2$, as depicted in FIG. 6.

After using Equation (8) to locate the sound source, the next step is to determine sound-power flow using the sound intensity vector measured by the AVPs. Usually this is performed for stationary (steady-state) sources but it can also be applied to quasi-stationary sources, i.e. to sources whose sound varies slowly compared to the rate of signal processing. Additionally it can be applied to impulsive sound.

Figure 7A:
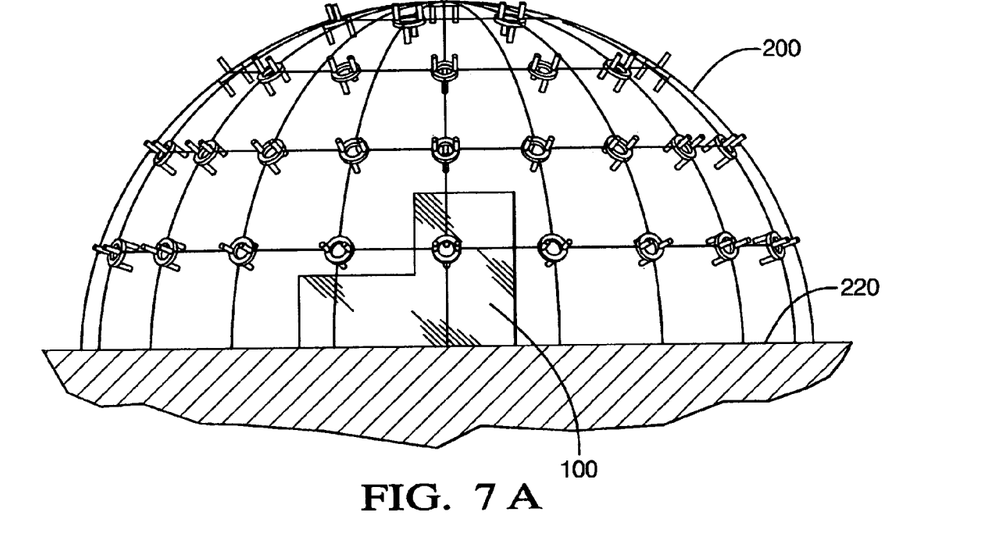
FIG. 7 depicts arrays of AVPs surrounding a source for measuring the sound power of the source: (a) a hemispherical array on a rigid base and (b) an array of known arbitrary shape adjacent to rigid surfaces.
Figure 7B:
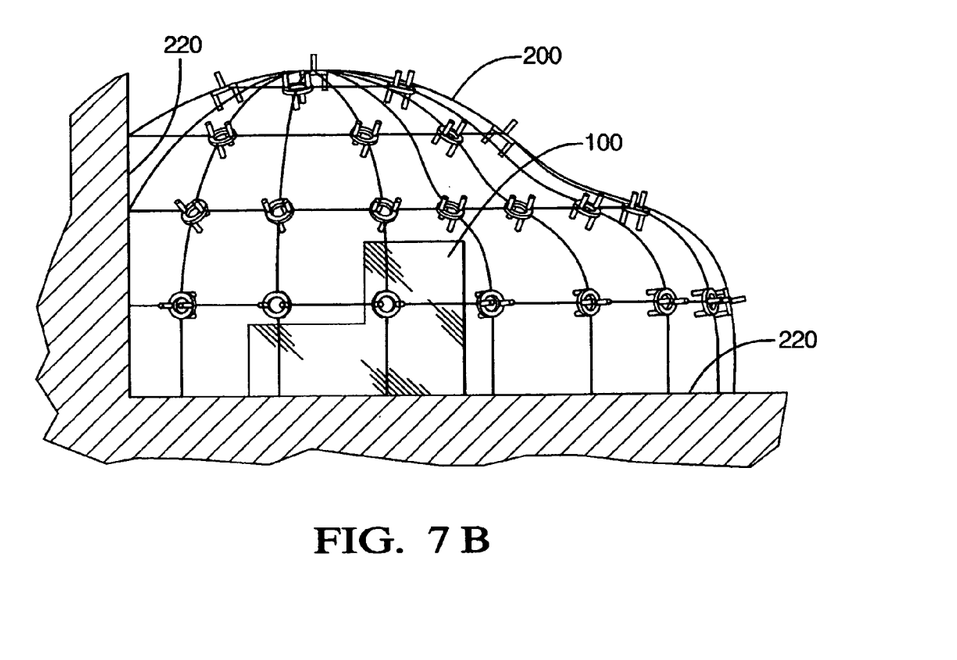

An important application is determining the sound power of a source using an array surrounding the source 100. Generally the array 200 is combined with rigid surfaces 220, as shown in FIG. 7. Previously measurements were made with two-microphone intensity probes aligned perpendicularly to the array. Such probes are bulky and expensive and it is impractical to have a sufficient number of them make measurements simultaneously at all points in the enclosing array. However replacing these probes with AVPs makes simultaneous measurements possible. Determining the sound power of the source then becomes much more rapid. Also, it becomes possible to measure the sound power of a quasi-stationary source. In addition use can be made of the triangulation formula to locate components of the source with a distinctive feature, such as a resonance. Such improved procedures can be used for quality control.

Figures 8A, 8B:
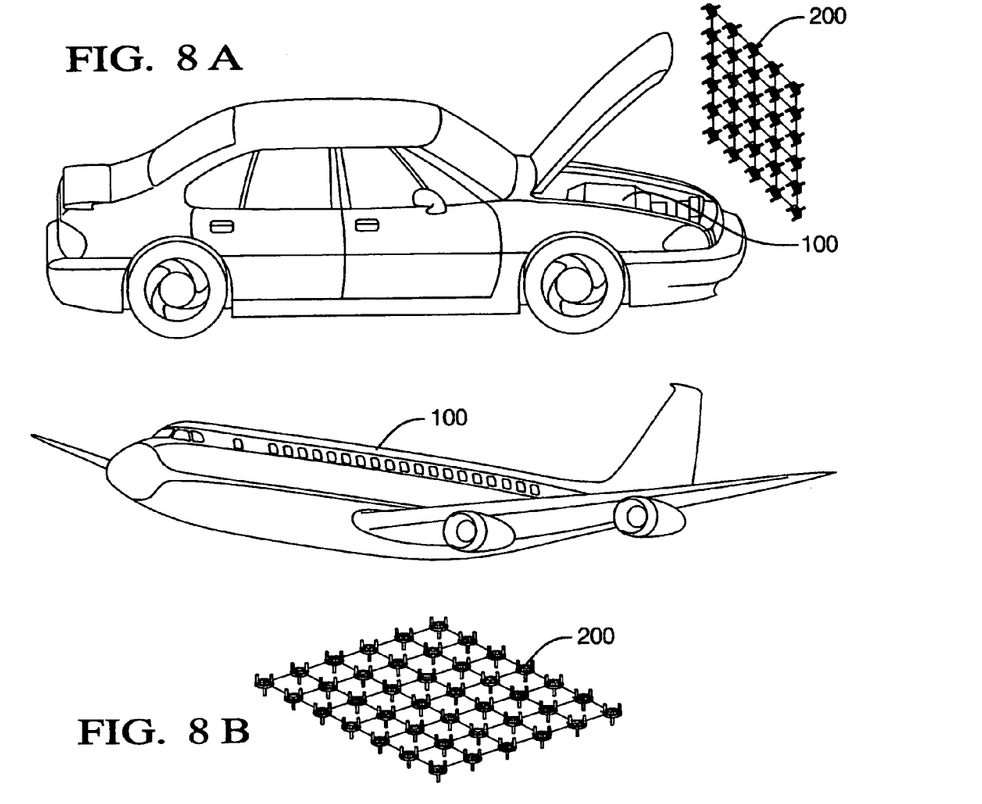
FIG. 8 depicts examples of arrays of AVPs where it is not possible to surround the source with the array: (a) investigating the sound from an engine compartment; and (b) investigating the sound of an aircraft flyover.

In FIG. 8 arrays are shown where it would not be practical to surround the source 100 with an array 200. FIG. 8 (*a*) shows an array used to investigate the sound from beneath the hood of a car. Here the least-squares triangulation formula can be used to locate sources that have distinctive features. FIG. 8 (*b*) shows an array used to investigate the flyover of an aircraft. The array concurrently locates and tracks the aircraft and measures its sound-power. A single AVP could be used for tracking and measuring sound power but an array determines the location of the source and provides statistically more reliable data. A sound-absorbing backing prevents interference from sound reflected by the ground or by the supporting base.

Figure 9:
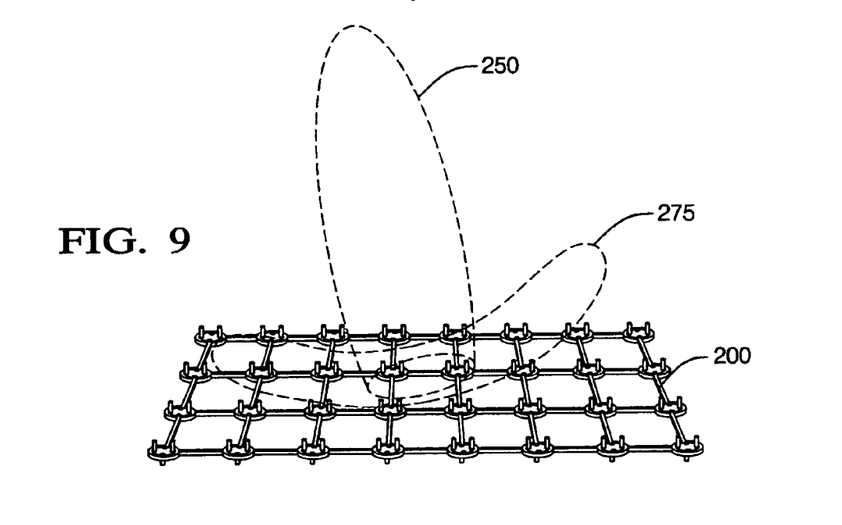
FIG. 9 depicts the phasing of sound pressure measurements by an array of AVPs to form a beam.

Sound pressure measured by an array of AVPs can be phased to form a sensitivity beam 250 with side lobe 275, as shown in FIG. 9. This beam can scan different parts of a source. Since the AVPs in the array measure sound-intensity concurrently with sound-pressure, the information can be used to determine the location of the highlighted part of the source using the triangulation formula. Also the information can be used to measure sound-power flow from the highlighted part. This is obtained by integrating sound intensity over the cross-section of the beam.

Finally replacing individual sound-pressure microphones in the array with AVPs will greatly improve the data input for computational methods of locating and quantifying sound sources.

APPENDIX

Derivation of Formula for Determining the Position of a Sound from Directions Provided by an Array of AVPs In the derivation, bold-face characters represent 3-dimensional vectors and matrices and the superscript T represents a vector transpose.

Given n AVPs at locations represented by the vectors $p_1, p_2, \ldots, p_n$, with corresponding unit vectors $u_1, u_2, \ldots, u_n$ pointing towards a sound source at an unknown location q. The least-squares estimate of q can then be determined from the given data using the formula $$q = \left[ nI - \sum_{i=1}^{n} u_i u_i^T \right]^{-1} \sum_{i=1}^{n} [I - u_i u_i^T] p_i \quad (A1)$$

where I is the 3×3 identity matrix. If $\delta_i$ is the perpendicular (shortest distance) from q to the ray from $p_i$ in the direction of $u_i$ then Equation (A1) locates q such that $\sum_{i=1}^{n} \delta_i^2$ is a minimum.

Proof

The displacement vector $q-p_i$ can be resolved into a component $u_i u_i^T (q-p_i)$ in the direction of $u_i$ and a component $(q-p_i) - u_i u_i^T (q-p_i)$ perpendicular to $u_i$, which can be rewritten as $(I - u_i u_i^T)(q-p_i)$. This latter component equals $\delta_i$ in length i.e.

$$\delta_i^2 = (q - p_i)^T (I - u_i u_i^T)^T (I - u_i u_i^T)(q - p_i)$$

which is then $$= (q - p_i)^T (I - u_i u_i^T)^T (q - p_i)$$

because $(I - u_i u_i^T)^T (I - u_i u_i^T)^2 = (I - u_i u_i^T)$, $(I - u_i u_i^T)$ being symmetric and idempotent.

For brevity let $A_i = (I - u_i u_i^T)$. Then summing over the n AVPs yields, $$\sum_{i=1}^{n} \delta_i^2 = \sum_{i=1}^{n} (q - p_i^T) A_i (q - p_i)$$

$$= q^T \sum_{i=1}^{n} A_i q - 2q^T \sum_{i=1}^{n} A_i p_i + \sum_{i=1}^{n} p_i^T A_i p_i$$

Or $$\sum_{i=1}^{n} \delta_i^2 = (q - r)^T A (q - r) - r^T A r + \sum_{i=1}^{n} p_i^T A_i p_i$$

where $$A = \sum_{i=1}^{n} A_i = nI - \sum_{i=1}^{n} u_i u_i^T \text{ and } r = A^{-1} \sum_{i=1}^{n} A_i p_i$$

Unless the vectors u are all parallel, A is positive definite, so that making q=r globally minimizes $\sum_{i=1}^{n} \delta_i^2$. This proves Equation (A1).

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

I claim:

1. An apparatus for remotely locating and quantifying sound sources comprising:
    an array of acoustic vector probes;
    said probes in said array connected to a multi-channel data acquisition system for rapid conversion of analog signals to digital form and for temporary data storage;
    said multi-channel system providing input to a digital signal processor programmed to compute the sound-intensity and sound-velocity vectors and sound pressure at each of said probes in said array;
    said processor connected to a device for outputting the results of the computations; and each of said acoustic vector probes comprises four microphones spatially positioned in three dimensional space.

2. The invention as in claim 1 wherein a least-squares triangulation formula determines the spatial coordinates of a sound source from a set of directions of the said sound intensity vectors in said array pointing to said source.

3. The invention as in claim 1 wherein said array is used to determine the sound power flow incident on said array from said sound source.

4. The invention as in claim 1 wherein said array surrounds a sound source and measures the sound-intensity vector simultaneously at all points in the array to determine the sound power of the source and investigate its acoustical properties.

5. The invention as in claim 1 wherein said array concurrently locates and tracks a moving source and measures the sound-power flow from said source incident on said array.

6. The invention as in claim 1 wherein the sound pressure measured by said probes in said array is phased to create a sensitivity beam capable of scanning a sound source.

7. The invention as in claim 6 wherein the said sound-intensity measurements made concurrently with said sound pressure by said probes in said array are used to determine the location of the part of the source within said beam using a least-squares triangulation formula; and to determine the sound power transmitted from said part within said beam.

8. The invention as in claim 1 wherein the quantities measured by said array are used to improve the input for computational methods of investigating sound sources.

9. The invention as in claim 1 wherein said output device enables an operator to use said acoustic apparatus interactively to locate and quantify sound sources, by filtering said data into any desired frequency bands and by adjusting the position of said array.

10. An apparatus for remotely locating and quantifying sound sources as defined in claim 1 further comprising:

each of said vector probes comprises four microphones spatially positioned at the vertices of a regular tetrahedron to determine sound intensity vectors.

11. An apparatus as defined in claim 10 further comprising:

each of said acoustic vector probes having two microphones facing a first direction and two microphones facing an opposite direction.

12. An apparatus as defined in claim 1 further comprising:

each of said acoustic vector probes having two microphones facing a first direction and two microphones facing an opposite direction.

13. An apparatus for remotely locating and quantifying sound sources comprising:

an array of acoustic vector probes;

said probes in said array connected to a multi-channel data acquisition system for rapid conversion of analog signals to digital form and for temporary data storage;

said multi-channel system providing input to a digital signal processor programmed to compute the sound-intensity and sound-velocity vectors and sound pressure at each of said probes in said array; and said processor connected to a device for outputting the results of the computations; and each of said acoustic vector probes having two microphones facing a first direction and two microphones facing an opposite direction.

* * * * *